United States Patent
Wrobel et al.

(10) Patent No.: US 11,775,846 B2
(45) Date of Patent: Oct. 3, 2023

(54) SYSTEM AND METHOD FOR DETERMINING VARIATIONS IN ESTIMATED VEHICLE RANGE

(71) Applicant: Toyota Motor Engineering & Manufacturing North America, Inc., Plano, TX (US)

(72) Inventors: Shannon Alicia Wrobel, Ann Arbor, MI (US); Tapan Patel, South Lyon, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 438 days.

(21) Appl. No.: 17/177,367

(22) Filed: Feb. 17, 2021

(65) Prior Publication Data
US 2022/0188668 A1   Jun. 16, 2022

Related U.S. Application Data

(60) Provisional application No. 63/125,574, filed on Dec. 15, 2020.

(51) Int. Cl.
*G06N 5/04* (2023.01)
*G07C 5/08* (2006.01)
(Continued)

(52) U.S. Cl.
CPC ............. *G06N 5/04* (2013.01); *G06V 20/59* (2022.01); *G07C 5/085* (2013.01); *B60W 40/13* (2013.01); *B60W 2530/10* (2013.01)

(58) Field of Classification Search
CPC .......... G07C 5/085; G06V 20/59; G06N 5/04; B60W 40/13; B60W 2530/10
See application file for complete search history.

(56) References Cited

U.S. PATENT DOCUMENTS 7,454,962 B2    11/2008  Nishiyama et al.
8,520,899 B2    8/2013   Brown et al.
(Continued)

FOREIGN PATENT DOCUMENTS

| CN | 102288364 A | * | 12/2011 |
| CN | 110874706 A | * | 3/2020 |
| GB | 2535773 A | | 8/2016 |

OTHER PUBLICATIONS

Berjoza et al.,"Effects of change in the weight of electric vehicles on their performance characteristics", Agronomy Research 15(S1), 952-963, 2017, found at: https://agronomy.emu.ee/wp-content/uploads/2017/04/Vol15SP1_Berjoza.pdf.
(Continued)

*Primary Examiner* — Kevin A Lathers
(74) *Attorney, Agent, or Firm* — Christopher G. Darrow; Darrow Mustafa PC (57) ABSTRACT

An alternative range estimating system for a vehicle includes one or more processors and a memory communicably coupled to the one or more processors. The memory stores a removable object selection module including computer-readable instructions that when executed by the one or more processors cause the one or more processors to control operation of a vehicle input/output system to display a selectable representation of each of one or more removable objects carried by the vehicle. The module may acquire a user selection of at least one removable object from the removable objects displayed. The module may acquire an estimated alternative vehicle range determined using an estimated weight of the at least one removable object. The module may then control operation of the input/output system to display the estimated alternative vehicle range.

18 Claims, 7 Drawing Sheets

(51) Int. Cl.
*G06V 20/59* (2022.01)
*B60W 40/13* (2012.01)

(56) References Cited

U.S. PATENT DOCUMENTS

| | | |
|---|---|---|
| 9,785,612 B2 | 10/2017 | Poechmueller et al. |
| 10,059,219 B2 | 8/2018 | Qiu et al. |
| 2002/0103056 A1* | 8/2002 | Ishiguro .................. F16H 61/20 |
| | | 477/120 |
| 2010/0138142 A1 | 6/2010 | Pease |
| 2013/0250050 A1 | 9/2013 | Kanaujia et al. |
| 2014/0303826 A1* | 10/2014 | Kobayashi .............. B60L 58/10 |
| | | 701/22 |
| 2016/0063435 A1* | 3/2016 | Shah .................. G06Q 30/0633 |
| | | 705/44 |

OTHER PUBLICATIONS

Mruzek et al.,"Analysis of Parameters Influencing Electric Vehicle Range", Procedia Engineering 134 (2016) pp. 165-174.
Acuitive Solutions, "Volumetric Weight Calculator: How to Simplify Calculation of Air Freight Rates", found at: https://www.acuitivesolutions.com/volumetric-weight-calculator/ (accessed on Feb. 16, 2021).

\* cited by examiner

SYSTEM AND METHOD FOR DETERMINING VARIATIONS IN ESTIMATED VEHICLE RANGE

CROSS REFERENCE TO RELATED APPLICATIONS

This application claims the benefit of U.S. Provisional Application No. 63/125,574, filed on Dec. 15, 2020, which is herein incorporated by reference in its entirety.

TECHNICAL FIELD

The subject matter described herein relates to determination of an estimated driving range of a vehicle and, more particularly, to determinations of how the driving range may be affected if one or more removable objects are removed from the vehicle to reduce the total weight of the vehicle and its contents.

BACKGROUND

A vehicle may include a vehicle range estimating system configured to estimate a remaining driving range of a vehicle, based on such factors as estimated current total vehicle weight, current battery state of charge (SOC) and/or conventional fuel level, current power/fuel level, estimated power/fuel usage, and any other pertinent factors. A key consideration in estimating vehicle range is the total weight of the vehicle and anything it is transporting and/or towing. However, while existing range estimating systems may provide range estimates based on the current weight of the vehicle and contents, such systems cannot determine how much (if any) additional vehicle range may be realized by removing one or more objects from the vehicle to reduce weight, unless the objects are actually removed and the estimated vehicle range calculated using the revised vehicle weight.

SUMMARY

In one aspect of the embodiments described herein, an alternative range estimating system for a vehicle is disclosed. The system includes one or more processors and a memory communicably coupled to the one or more processors. The memory stores a removable object selection module including computer-readable instructions that when executed by the one or more processors cause the one or more processors to control operation of a vehicle input/output system to display at least one selectable representation of an associated at least one removable object carried by the vehicle. The module may acquire a user selection of at least one removable object from the at least one representation of the associated at least one removable object. The module may acquire an estimated alternative vehicle range determined using an estimated weight of the user-selected at least one removable object. The module may then control operation of the input/output system to display the estimated alternative vehicle range.

In another aspect of the embodiments described herein, a method of controlling operation of a vehicle input/output system is provided. The method includes a step of controlling the system to display at least one selectable representation of an associated at least one removable object carried by the vehicle. A user selection of at least one removable object from the at least one representation of the associated at least one removable object is acquired. An estimated alternative vehicle range is acquired, the estimated alternative vehicle range being determined using an estimated weight of the at least one removable object. Operation of the system is then controlled to display the estimated alternative vehicle range.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a system for estimating possible alternative ranges of a vehicle. The alternative ranges may be calculated based on various estimated alternative weights of the vehicle. Each estimated alternative weight may be based on a change in the total weight of the vehicle and its contents after removal one or more user-selected removable object(s) from the vehicle. Removable objects positioned in the vehicle may be detected and selectably displayed so that a user can see the position of each object in the vehicle. A user may select one or more of the objects for possible removal from the vehicle.

The weight(s) of the selected object(s) may be subtracted from an estimated total weight of the vehicle and its contents to produce an alternative vehicle weight. The alternative vehicle weight may then be used by an existing vehicle range estimating system (VRES) to calculate a new estimated range that the vehicle would have if the selected object(s) are removed. A user can select one or more removable objects in any combination and estimate the effect of object removal on vehicle range to ascertain an optimal weight-based strategy for achieving a desired vehicle range.

Figure 1:
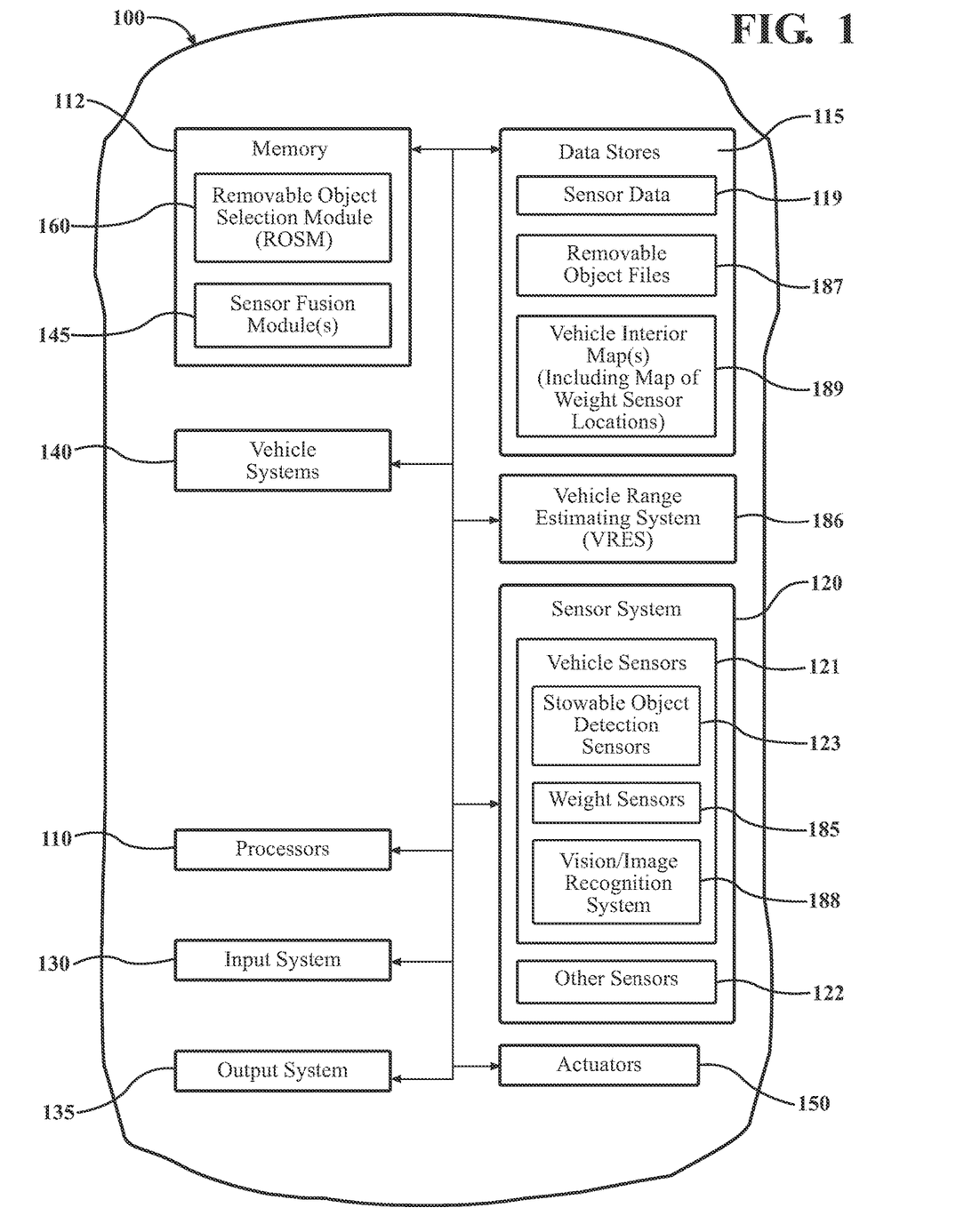
FIG. 1 is a block schematic diagram illustrating a vehicle incorporating an alternative range estimating system for a vehicle, in accordance with an embodiment described herein.

Referring to FIG. 1, an example of a vehicle 100 is illustrated. As used herein, a "vehicle" is any form of motorized transport. In one or more implementations, the vehicle 100 is conventionally-powered, hybrid, or electric passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating an alternative range estimating system in accordance with an embodiment described herein. The "alternative range" estimated by the system may be an estimated range of the vehicle if one or more user-selected removable objects are removed from the vehicle.

Referring to FIG. 1, the vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include removable object files 187. The removable object files 187 can include information relating to removable objects currently residing in or on the vehicle 100. In one aspect, a "removable object" may be a stowable object that is designed to be carried by the vehicle and which may be intermittently or periodically removed from the vehicle by the user in normal use of the vehicle. Examples of such objects are items that may be included with the vehicle at purchase, such as a spare tire, a jack, and removable vehicle seats. Such items may be positioned at predetermined locations in or on the vehicle, and sensors may be provided to detect the presence and absence of such objects at any given time. The weight of any such objects may also be known and determined prior to vehicle sale and may be stored in an associated removable object file in data stores 115 for use by the alternative range estimating system as described herein. A location for such an object on an interior "map" of the vehicle may also be known, as the stowable object may have a pre-assigned designated location in the vehicle. In another aspect, a "removable object" may also include any object positionable in or on the vehicle sometime after purchase of the vehicle and able or adapted to be carried by the vehicle for one or more trips. Examples of such objects may include the driver and any passengers and other animate objects (such as pets), and cargo items carried by the vehicle.

A removable object file 187 may be generated for each removable object. A removable object file 187 can include information such as an object identifier (i.e., a unique name or designation for each removable object) and values of object parameters, such as an estimated weight of the object, digital map coordinates or other information representing a location of the object in the vehicle, a list of weight sensors overlied by the object, information describing a shape and area of a two-dimensional boundary or "footprint" of the object, code for a displayable text string describing the location of the object in the vehicle, and any other information pertinent to the object and to performance of the alternative range estimating system functions described herein. As stated previously, the weights and locations for stowable objects may be known if the objects are in pre-defined positions in the vehicle. Values of parameters (weight, location, etc.) of other movable objects may be determined or estimated as described herein.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on the each of vehicle weight sensors 185 and the vision/image recognition system 188.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that an operator or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. Various examples of sensors of the sensor system 120 are described herein. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to vehicle systems and components, including data stores 115, processor(s) 110, and sensor fusion module(s) 145 for storage and processing of vehicle sensor data. Sensor system 120 may include sensors configured to detect and generate indications of the current state or status of vehicle systems and components.

Sensor system 120 may include vehicle sensors 121. The vehicle sensor(s) 121 can detect, determine, and/or sense information about the vehicle 100 itself and/or any occupants and/or other objects inside the vehicle interior, including objects located in trunk and/or cargo spaces. Vehicle sensors 121 may include stowable object detection sensors 123 configured to detect the presence and absence of stowable removable objects such as a spare tire, a jack, and one or more removable seats for example. The sensors 123 may detect whether such objects are present or absent from their assigned, predetermined locations in the vehicle. If any stowable objects are present, a user may elect to remove them in order to increase vehicle range. As such objects are included with the vehicle as sold and are intended to be carried by the vehicle during normal use. The weights of such objects may be stored in an associated removable object data file.

Vehicle sensors 121 may include at least one weight sensor 185 operably coupled to a surface of the vehicle 100. Each weight sensor(s) 185 may be configured to detect a component of a weight of at least one removable object positioned in the vehicle when at least a portion of the removable object contacts the surface of the vehicle operably coupled to the weight sensor. Each weight sensor 185 may be embedded in (or otherwise operably coupled to) a surface capable of supporting a removable object, or otherwise positioned so as to enable detection of weight of an object resting on the sensor or on a surface above or coupled to the sensor. In one or more arrangements, each weight sensor may be positioned to measure a weight component at a location where a removable object may be positioned and where a weight sensor may be positioned. Each surface where an object may be positioned may have at least one weight sensor 185 operably coupled thereto. The resolution and accuracy of removable object weight estimates may be improved by increasing the number of weight sensors distributed along the surfaces usable for supporting removable objects. However, various known data processing techniques may also be used to generate estimates of object weight using data from relatively fewer weight sensors.

Figure 2:
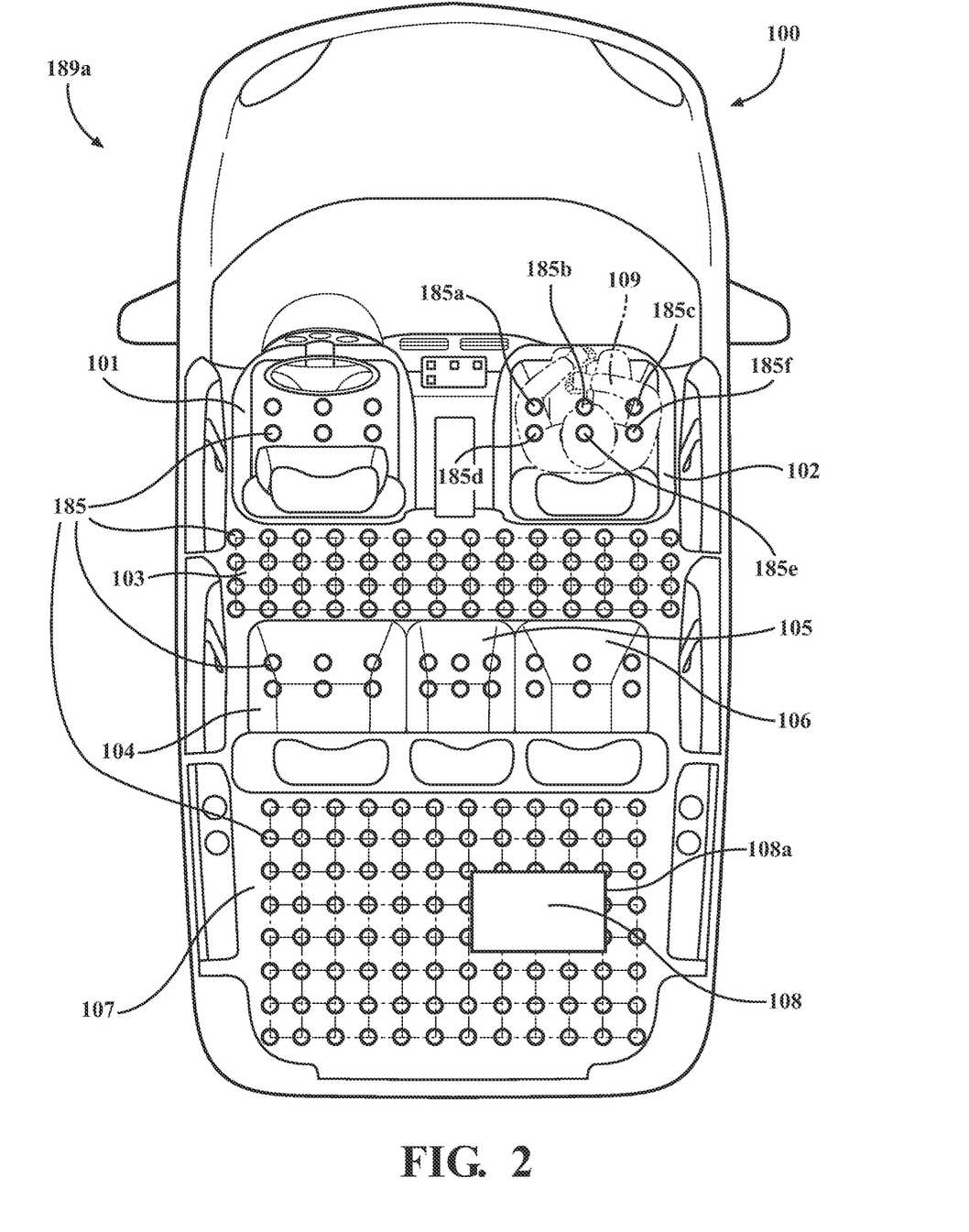
FIG. 2 is a schematic view of a digital map illustrating an exemplary positioning of a network of weight sensors 185 distributed through a vehicle interior to measure weight components of removable objects positioned in the vehicle interior.

Each weight sensor 185 may be assigned a distinctive designation or identifier for reference purposes. A location of each weight sensor 185 in the vehicle may be assigned coordinates on a digital map of the vehicle interior. FIG. 2 shows one example 189*a* of such a digital map illustrating a network of weight sensors 185 distributed in grid patterns over various removable object support surfaces of the vehicle 100, including a driver seat 101, front passenger seat 102, a floor surface 103 located behind the vehicle front seats 101 and 102, the rear passenger seats 104, 105, 106, and a trunk or cargo space 107. FIG. 2 shows a vehicle interior digital map 189*a* including locations of vehicle weight sensors 185 for use by the vehicle systems and components in determining what sensors are overlied by removable objects, as described herein.

The sensor system 120 may include a vision/image recognition system 188. One or more elements of the alternative range estimating system may be in communication with the vision/image recognition system 188 so that information from the vision/image recognition system 188 may be received and utilized by elements of the alternative range estimating system. Alternatively, the alternative range estimating system may include the vision/image recognition system 188.

Figure 3:
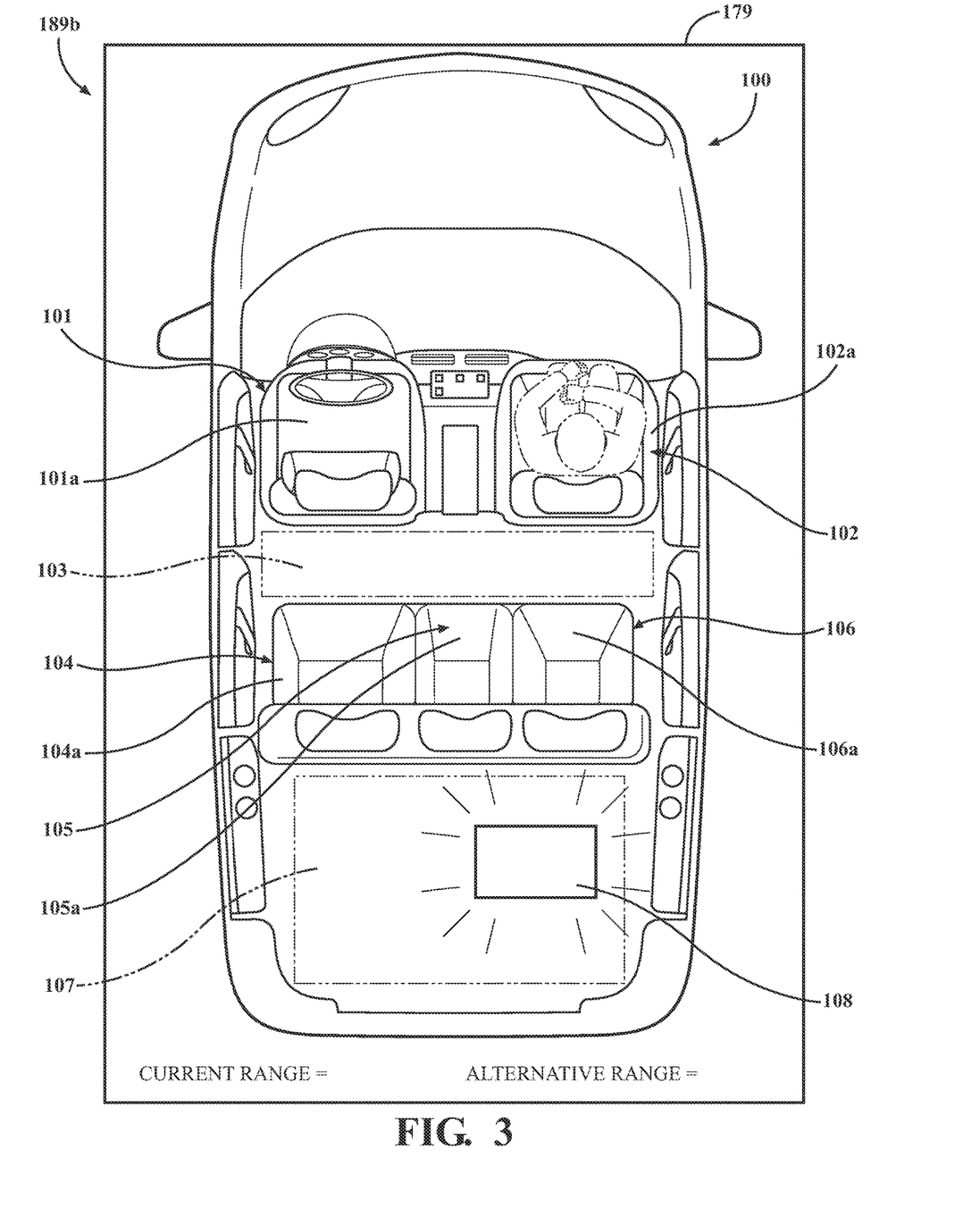
FIG. 3 is a schematic view of another version of a digital map similar to the map shown in FIG. 2, presenting a view of the vehicle interior onto which selectable representations of one or more removable objects carried by the vehicle may be superimposed to show a user positioned of the objects within the vehicle and to enable user selection of the objects for possible removal from the vehicle.

In one or more arrangements, the vision/image recognition system 188 may be configured to determine values of parameters of removable object(s) positioned in the vehicle. The parameters may include boundary parameters and a location parameter. The vision/image recognition system 188 may be configured to scan the vehicle interior spaces including the occupant compartment (where the driver, passengers, pets, etc. may reside during vehicle use) and the trunk and other areas where removable objects such as cargo may be positioned during vehicle use. The vision/image recognition system 188 may be configured to scan the vehicle interior areas as represented in a digital map of the interior areas, such as shown in FIG. 2. FIG. 3 shows an interior digital map 189*b* similar to the map shown in FIG. 2, but without the sensor locations shown in FIG. 2. The map 189*b* of FIG. 3 may form a basis for an exemplary screen display (for example, a touch screen display) including user-selectable digital representations of removable objects. As described herein, a user may select at least one removable object from the screen to determine the effect of object removal on estimated vehicle range. In one or more arrangements, the digital map 189*b* may represent an "aerial" or plan view of the interior as shown in FIG. 3, from which vehicle interior surfaces capable of supporting removable objects may be scanned. Such surfaces may include, for example, the seat bottom 101*a* of driver seat 101, the seat bottom 102*a* of driver seat 102, vehicle rear seat bottoms 104*a*, 105*a*, 106*a*, the floor surface 103 behind the front seats 101, 102, and the trunk or cargo space 107 located behind the rear seats. Other surfaces may also be scanned, depending on the design of a particular vehicle.

The vision/image recognition system 188 may include cameras positioned at any locations in the vehicle necessary for scanning any removable object positioning areas. The system 188 may be configured to detect and distinguish between separate objects such as individual passengers and inanimate objects. The system 188 may be configured to distinguish or determine "removable" objects of the scanned objects. In one or more arrangements, scanned objects may be determined to be "removable" objects based on a comparison between a recently scanned interior with reference scans of the vehicle interior when "empty" (i.e., containing no passengers, cargo, or any other items that did not reside in the interior at the time the vehicle was purchased). Any such objects not appearing in the reference "empty" scan may be determined to be "removable". Alternative criteria for determining removable objects may also be used.

The system 188 may be configured to determine or estimate, and also store, values of parameters of each of the one or more removable objects detected. Parameters may include an object identifier, a location of the object, a list of weight sensors overlied by the object, an area occupied by the object, object boundary line dimensions, locations, and other characteristics, and identifiers of any weight sensors overlied by the object. Values of other parameters and other information may also be acquired or determined by the system 188. The system 188 may be configured to generate or populate a removable object parameter data file for each removable object. Each data file may include the parameters values and other information relating to an associated removable object. The data file(s) may be stored in data stores 115 or another suitable location.

In one or more arrangements, the system 188 may be configured to scan the vehicle interior spaces for removable objects at the start of every vehicle trip, after the vehicle is turned on but before the vehicle starts to move. In one or more arrangements, the system 188 may be configured to scan the vehicle interior spaces for removable objects at regular intervals while the vehicle is turned on, to help detect the addition of objects to (and removal of objects from) the interior while the vehicle is running. Other criteria for scanning may also be used.

As stated previously, the version of the digital interior map (FIG. 2) including sensor locations may include the map locations of the vehicle weight sensors positioned to measure the weight components of objects positioned on surfaces of the vehicle interior. All map locations may be specified according to a reference location and an associated coordinate system, for example.

The vision/image recognition system 188 may be configured to determine, using the values of the parameters (e.g., footprint area, edge dimensions, etc.) of a removable object and the sensor map including locations of any weight sensors positioned in the vehicle, all weight sensors which are overlied by a given removable object. The system 188 may be configured to determine the two-dimensional boundaries or "footprints" occupied on the digital map 189*a* by objects determined to be removable. The system 188 may be configured to determine the edges or boundary lines of each object and to associate these boundary lines with digital map coordinates. The system 188 may be configured to determine (or assign, for reference purposes) a map location of each object based on its map position and footprint. In one or more arrangements, the map location of the object may be the map coordinates of a calculated centroid of the footprint area.

The system 188 may be configured to compare edges of each removable object with the map locations of the distributed weight sensors, to determine which weight sensors are overlied by the object. An object may be considered to overlie a weight sensor when the object "covers" the weight sensor location or an edge of the object intersects a weight sensor location. For example, referring to FIG. 2, the footprint of the passenger 109 in seat 102 detected by the vision/image recognition system 188 overlies the weight sensors 185*a*-185*f*. Thus, the readings of each of weight sensors 185*a*-185*f* may reflect a portion or component of the passenger's weight. Readings from these sensors may be integrated or "fused" to provide an estimate of the total weight of the passenger 109 as described herein. The system 188 may be configured to associate weight sensors overlied by a removable object with the removable object, to help identify weight sensors which may be measuring components of the object weight. The above-described procedure for identifying weight sensors associated with each removable object may be repeated for every scan of the vehicle interior, to detect removal and addition of objects and also movement of objects already positioned in the interior.

The system 188 may be configured to store image data of all removable objects and to recognize removable objects positioned in the vehicle (including objects that have been present in the vehicle for more than one trip of the vehicle) based on stored image data. The system 188 may be configured to generate and store images of objects determined to be removable, for purposes of display to a user. Current images may be compared with stored images of objects from previous trips to identify "multi-trip" removable objects. Shapes and positions of the removable objects from the current and previous trips may be compared to detect objects that have remained in the vehicle. In one or more arrangements, the system 188 may be configured to acquire images of the vehicle interior after the vehicle has been turned off and has been unoccupied by any people or other living objects for at least a predetermined user-selectable period of time. This feature may aid in distinguishing between separate trips by the vehicle. The system 188 may be configured to compare such images with images of the vehicle interior from the previous trip. Any removable objects appearing in the images of the vehicle when shut down may be considered to have been left in the vehicle after the previous trip had ended. Any of these object(s) detected in the vehicle after the start of the following trip may be considered "multi-trip" removable objects for the purposes described herein. The removable object selection module (ROSM) 160 (described in greater detail below) may be configured to acquire (or the system 188 may be configured to communicate to the ROSM) information relating to any detected "multi-trip" removable objects. In one or more arrangements, the ROSM 160 may be configured to generate an alert message directed to informing a user of any removable object(s) that appear to have been in the vehicle for more than one trip. The ROSM 160 may also be configured to highlight or otherwise distinguish such objects from other removable objects displayed to the user, to focus the user's attention on the "multi-trip" removable objects.

In one or more alternative arrangements, the vision/image recognition system 188 may be configured to forward at least a list of all weight sensors determined to be overlied by each removable object (along with an associated object identifier) to a sensor fusion module 145. The sensor fusion module 145 may be configured to receive sensor data from all weight sensors 185 and to integrate or otherwise process the weight sensor data pertaining to each removable object to determine an estimated weight of each removable object. These estimated weights may be forwarded to a removable object data file associated with the object. When an object is selected for potential removal by a user, the estimated weight(s) of the object(s) may be acquired by (or forwarded to) the VRES 186, after which the VRES 186 can determine the estimated alternative vehicle weight and estimated alternative vehicle range.

The vehicle may include a vehicle range estimation system (VRES) 186. In one or more arrangements, the VRES 186 may include a memory with computer-readable instructions that when executed by the one or more processors 110 cause the one or more processors to perform the vehicle range estimating functions described below. The VRES 186 may be configured to estimate a current range of the vehicle 100 based on an estimated total current weight of the vehicle 100 and its contents. The vehicle range estimation system 186 may be configured to estimate a current range of the vehicle 100 based on such factors as estimated current vehicle weight, current battery state of charge (SOC) and/or conventional fuel level, current power/fuel usage, estimated power/fuel usage, and any other pertinent factors. Any of a variety of known algorithms may be operably incorporated into the VRES 186 and used to estimate a current range of the vehicle at any given point in time, according to vehicle design and other factors. The estimated current vehicle weight may be a total weight of the vehicle including the weights of all removable objects positioned in and on the vehicle at the time the current vehicle weight is determined.

The VRES 186 may also be configured to estimate one or more alternative ranges of the vehicle 100, based on proposed or hypothetical changes in the current vehicle weight which may be realized from removing one or more associated removable objects from the vehicle. The VRES 186 may be configured to receive an estimated alternative vehicle weight and, using one or more associated algorithms and any required additional data and/or information, determine an estimated alternative vehicle range based on the estimated alternative vehicle weight. In one or more arrangements, the vehicle range estimating system 186 may be configured to determine an alternative estimated range of the vehicle using an alternative weight of the vehicle equal to an estimated current weight of the vehicle, less an estimated weight of one or more user-selected removable objects. Essentially, the estimated alternative vehicle weight may be substituted in the VRES algorithm for the estimated current vehicle weight, for purposes of determining an alternative estimated vehicle range.

In one or more particular arrangements, the vehicle range estimation system 186 may be a part of the alternative range estimating system. In an embodiment where the VRES 186 is part of the alternative range estimating system, the VRES 186 may communicate with other elements of the alternative range estimating system to perform the alternative range estimating functions described herein.

Referring again to FIG. 1, the vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between an operator and the vehicle 100. The input system 130 can receive an input from a vehicle occupant (e.g., a driver or a passenger) or an operator located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote operator. The output system may include a display screen, such as a touch screen. The terms "vehicle input/output system 130/135" and "I/O system" as used herein refer collectively to the input system 130 and the output system 135. Thus, a removable object selection module (ROSM) 160 (described in greater detail below) may control operation of both the vehicle input system and output system as needed, either individually or simultaneously, to perform functions described herein.

The vehicle 100 can include one or more actuators 150. The actuators 150 can be any element or combination of elements operable to modify, adjust and/or alter one or more of the vehicle systems or components thereof to responsive to receiving signals or other inputs from the processor(s) 110 and/or the removable object selection module 160. Any suitable actuator can be used. For instance, the one or more actuators 150 can include motors, pneumatic actuators, hydraulic pistons, relays, solenoids, and/or piezoelectric actuators, just to name a few possibilities.

Referring again to FIG. 1, the vehicle 100 can include a sensor fusion module 145. The sensor fusion module may store one or more sensor fusion algorithms (or may incorporate or be in communication with a computing device storing an algorithm) configured to accept data from the sensor system 120 as an input. The data may include, for example, data representing information sensed at the sensors of the sensor system 120. The sensor fusion algorithm may include or be configured to be executed using, for instance, a Kalman filter, Bayesian network, or other algorithm. The sensor fusion algorithm may provide various assessments based on the data from sensor system 120.

The vehicle 100 can also include one or more vehicle systems, collectively designated 140. Various examples of the one or more vehicle systems 140 can include a propulsion system, a braking system, a steering system, throttle system, a suspension system, a transmission system, a climate control system, and/or a navigation system, none of which are shown in FIG. 1. Each of these systems can include one or more devices, components, and/or a combination thereof, now known or later developed. It should be appreciated that each or any of the vehicle systems or portions thereof may be combined or segregated via hardware and/or software within the vehicle 100.

Referring again to FIG. 1, the vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Embodiments of the alternative range estimating system described herein may include a removable object selection module (ROSM) 160. In one or more arrangements, the ROSM 160 may include computer-readable instructions that when executed by the one or more processors cause the one or more processors to control operation of the vehicle input/output system 130/135 to display at least one selectable representation of an associated at least one removable object carried by the vehicle. The removable object(s) may be objects previously identified by the vision/image recognition system 188. A "selectable representation" of the removable object may be, for example, an image of the object displayed on a touch screen and which may be selectable by a user touching the portion of the screen containing the image. Alternatively, any other communication medium enabling user selection of one or more removable objects may be used.

In one example, the vehicle interior may be displayed in the manner shown in FIG. 3. The ROSM 160 may control operation of the vehicle input/output system to display images of all removable objects on a display screen 179, such as a touch screen. The object images may be overlaid upon an image of a digital map of the vehicle interior. The selectable representation(s) of the removable objects may be imposed on the digital map to show their respective positions in the vehicle. Each removable object displayed may be selected by touching the portion of the display screen showing the object. Objects may be selected and de-selected by successive touches of the screen, in a "toggling" arrangement. Each selected object may be highlighted when selected and un-highlighted when de-selected as shown for object 108 of FIG. 3. FIG. 3 shows an example of an object 108 in the vehicle cargo space 107 which appears highlighted on the display screen responsive to user selection. The object 108 may have a 2D boundary or footprint 108a detectable and displayable by the vision/image recognition system 188. By this arrangement, one or more removable objects may be rapidly and conveniently selected and de-selected to enable various permutations of alternative vehicle range to be reviewed by a user. Digital maps and images used to populate the display may be generated and/or provided by the image/vision recognition system.

When an object is selected, the display may also display additional information relating to the object, such as an object identifier, an estimated object weight, a text message specifying a location of the object (e.g., "rear right side passenger seat"), and other information. The ROSM 160 may be configured to enable user selection of multiple objects simultaneously. The ROSM 160 may be configured to receive a user selection of all selected objects.

In one or more arrangements, the ROSM 160 may be configured to acquire a user selection of at least one removable object from the representation(s) of the removable object displayed. "Acquiring" information may include receiving the information from another element of the alternative range estimating system, either responsive to a request from the receiving entity or without a request. "Acquiring" information may also including scanning an information source (for example, a data file) to obtain the information. "Acquiring" may also include computing or calculating the information. For example, a user may touch representation(s) of one or more removable objects as displayed on a touch screen to select the objects. This user selection of one or more removable objects may be received by the ROSM and acted upon as described herein.

The ROSM 160 may be configured to acquire an estimated alternative vehicle range determined using an estimated weight of at least one removable object selected by a user. For example, in one or more arrangements, the ROSM 160 may be configured to acquire the estimated current vehicle weight. The estimated current vehicle weight may be acquired from the vehicle range estimating system 186. The acquired estimated current vehicle weight may be a weight to be used by the vehicle range estimating system 186 in determining the estimated current vehicle range.

The ROSM 160 may also be configured to acquire an estimated weight of at least one user-selected removable object. This weight may be acquired by the ROSM estimating the object weight as described below. In another example, the weight of the removable object may be obtained from an associated removable object data file. The ROSM 160 may also be configured to determine an estimated alternative vehicle weight by subtracting the weights of all user-selected removable objects from the estimated current vehicle weight. The ROSM may also be configured to communicate the estimated alternative vehicle weight to the VRES 186 for use in determining an estimated alternative vehicle range. The estimated alternative vehicle weight may be used by the VRES 186 in the same manner as any other weight estimate would be used to determine an estimated vehicle range. The ROSM 160 may be configured to acquire, from the VRES 186, the estimated alternative vehicle range for communication to the user.

In one or more arrangements, the ROSM 160 may be configured to determine the estimated weight of each removable object. The ROSM 160 may be configured to acquire a list of weight sensors overlied by each removable object, including one or more removable objects selected by a user. The list of overlied weight sensors may be acquired from the vision/image recognition system 188 directly or from an associated removable object data file. The ROSM 160 may be configured to acquire weight sensor data from all weight sensors overlied by each removable object. The ROSM 160 may be configured to determine, using the weight sensor data and the parameter values (including a list of weight sensor(s) overlied by each removable object), an estimated weight of each removable object.

For each removable object, the ROSM 160 may integrate or otherwise suitably combine data from the weight sensors overlied by the object to estimate a weight of the object based on the data contributions of each sensor. For example, the ROSM 160 may include or be in communication with another element (such as sensor fusion module 145) including a sensor fusion capability adapted to process the weight sensor data in a suitable manner. If multiple removable objects are selected by a user, the total weight of the selected objects may be subtracted from the estimated current vehicle weight by the RSOM 160 to generate an estimated alternative vehicle weight to be passed to the VRES 186 for estimation of the alternative vehicle range. Estimated object weights may be stored in associated removable object data files.

In one or more alternative arrangements, the vision/image recognition system 188 may be configured to forward a list of all weight sensors determined to be overlied by each removable object (along with an associated removable object identifier) to sensor fusion module 145. The sensor fusion module 145 may be configured to receive sensor data from all weight sensors 185 and to integrate or otherwise process the weight sensor data pertaining to each removable object to determine an estimated weight of each removable object. Each of these estimated weights may be forwarded to a removable object data file associated with the object. When an object is selected for potential removal by a user, the estimated weight(s) of the object(s) may be acquired by (or forwarded to) the VRES 186, after which the VRES can determine the estimated alternative vehicle weight and estimated alternative vehicle range.

In one or more arrangements, the ROSM 160 may be configured to control operation of the vehicle input/output system 130/135 to display the estimated alternative vehicle range after this range has been estimated by a vehicle range estimating system 186 as described herein and acquired by the ROSM. The estimated alternative vehicle range may be an estimated range of the vehicle 100 if the user-selected object(s) associated with the estimated alternative vehicle weight were to be removed from the vehicle. In one or more arrangements, the removable object selection module 160 may also be configured to acquire the estimated current vehicle range and to display both the estimated current vehicle range and the estimated alternative vehicle range simultaneously for comparison by a user.

Because an estimated weight for each separate removable object has been determined prior to user selection of one or more removable objects, the user can quickly and easily select and deselect one or more removable objects in any combination, and the ROSM 160 may simultaneously display the associated estimated alternative vehicle range and the estimated current vehicle range for comparison.

As stated previously, the removable object selection module 160 may also be configured to control operation of the vehicle input/output system 130/135 to, responsive to a determination by the vision/image recognition system that one or more removable objects have been present in the vehicle for more than one trip of the vehicle, generate an alert message directed to identifying to a user the removable object(s) that have been present in the vehicle for more than one trip of the vehicle. For example, the ROSM 160 may be configured to control operation of the vehicle input/output system 130/135 to highlight, on a display screen, a user-selectable representation of the removable object(s) that have been in the vehicle for more than one trip of the vehicle. The ROSM may also be configured to control operation of the vehicle input/output system to display an estimated alternative vehicle range comprising an estimated vehicle range if the removable object(s) that have been in the vehicle for more than one trip of the vehicle are removed.

In one or more alternative arrangements, the removable object selection module 160 may be configured to forward object identifier(s) of the user-selected removable object(s) to the VRES 186. The VRES may then access the estimated weights of the user-selected removable object and subtract the total weight of the user-selected objects from the estimated current vehicle weight to determine the estimated alternative vehicle weight. The VRES may then determine the estimated alternative vehicle range using the estimated alternative vehicle weight and forward the estimated alternative vehicle range to the I/O system for display.

Figure 4:
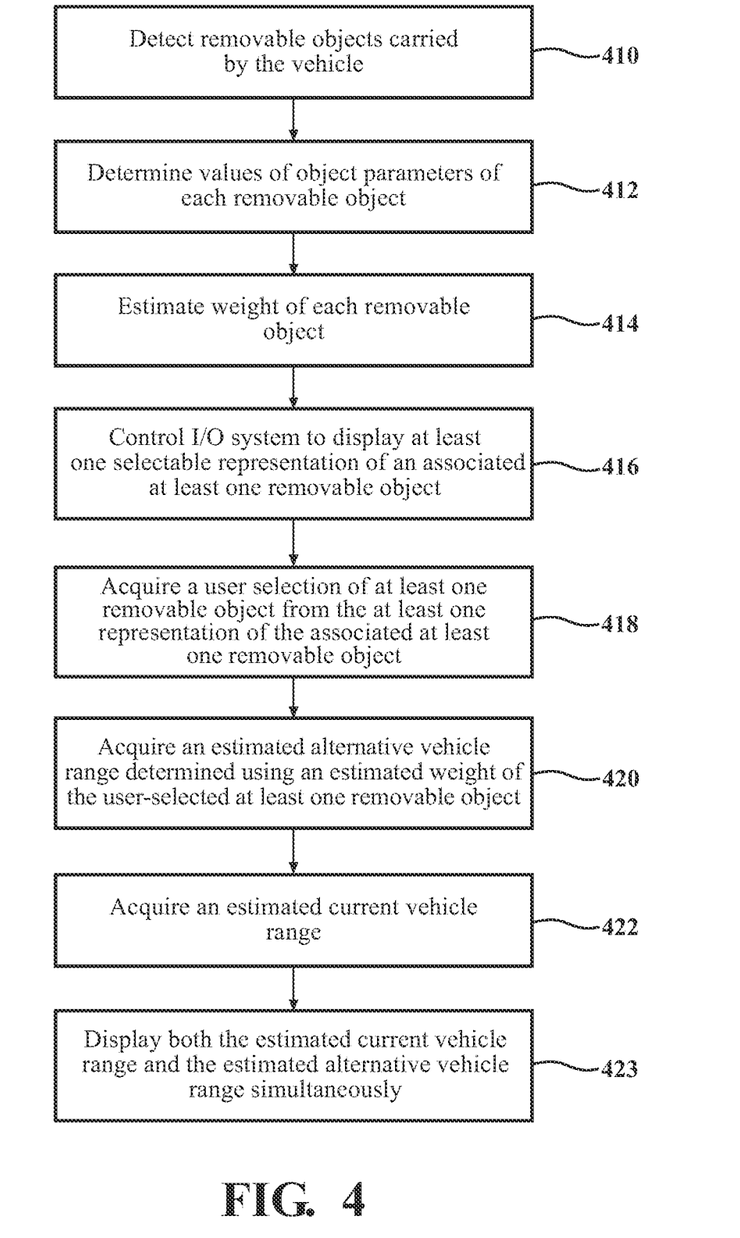
FIG. 4 is a block schematic flow diagram illustrating a method of controlling operation of a vehicle input/output system in accordance with an embodiment described herein.

FIG. 4 is a block schematic flow diagram illustrating a method of controlling operation of a vehicle input/output system in accordance with an embodiment described herein. Referring to FIG. 4, in block 410 the vision/image recognition system 188 may detect removable objects in the vehicle interior as previously described. In block 412, the vision/image recognition system 188 may determine values of object parameters of each removable object detected, in a manner previously described. In block 414, a weight of each detected removable object may be estimated in a manner previously described. In block 416, the removable object selection module 160 may control a vehicle input/output (I/O) system 130/135 in a manner previously described to display at least one selectable representation of an associated at least one removable object carried by the vehicle. In block 418, the removable object selection module 160 may acquire a user selection of at least one removable object from the at least one selectable representation of the associated at least one removable object displayed by the input/output system 130/135. In block 420, the removable object selection module 160 may acquire an estimated alternative vehicle range determined using an estimated weight of the user-selected at least one removable object. In one or more arrangements, the estimated alternative vehicle range may be determined by the existing vehicle range estimating system (VRES) 186. In block 422, the removable object selection module 160 may acquire an estimated current vehicle range. In one or more arrangements, the estimated current vehicle range may be determined by the existing vehicle range estimating system (VRES) 186. In block 423, the removable object selection module 160 may control operation of the I/O system 130/135 to display both the estimated current vehicle range and the estimated alternative vehicle range simultaneously for user comparison. Using the system described, the user may select any removable object or combination of removable objects to determine an estimated effect of object removal on vehicle range.

Figure 5:
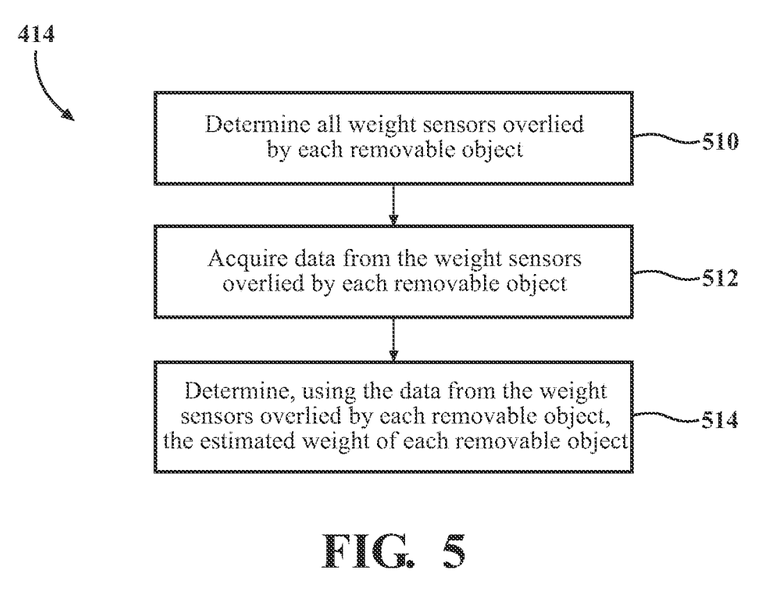
FIG. 5 is a block schematic flow diagram illustrating an example of a method of estimating a weight of each removable object positioned inside the vehicle and residing, at least partially, on a surface operably coupled to a weight sensor.

FIG. 5 is a block schematic flow diagram illustrating an example of a method of estimating a weight of each removable object per block 414 of FIG. 4. Referring to FIG. 5, in block 510, all weight sensors overlied by each removable object may be determined in a manner described herein. In block 512, weight sensor data for each removable object may be acquired from all of the weight sensors overlied by the removable object. In block 514, using the data from the weight sensors overlied by each removable object, the estimated weight of each removable object may be determined in a manner previously described. After an estimated weight for each removable object has been determined, control may pass to block 416 of FIG. 4.

Figure 6:
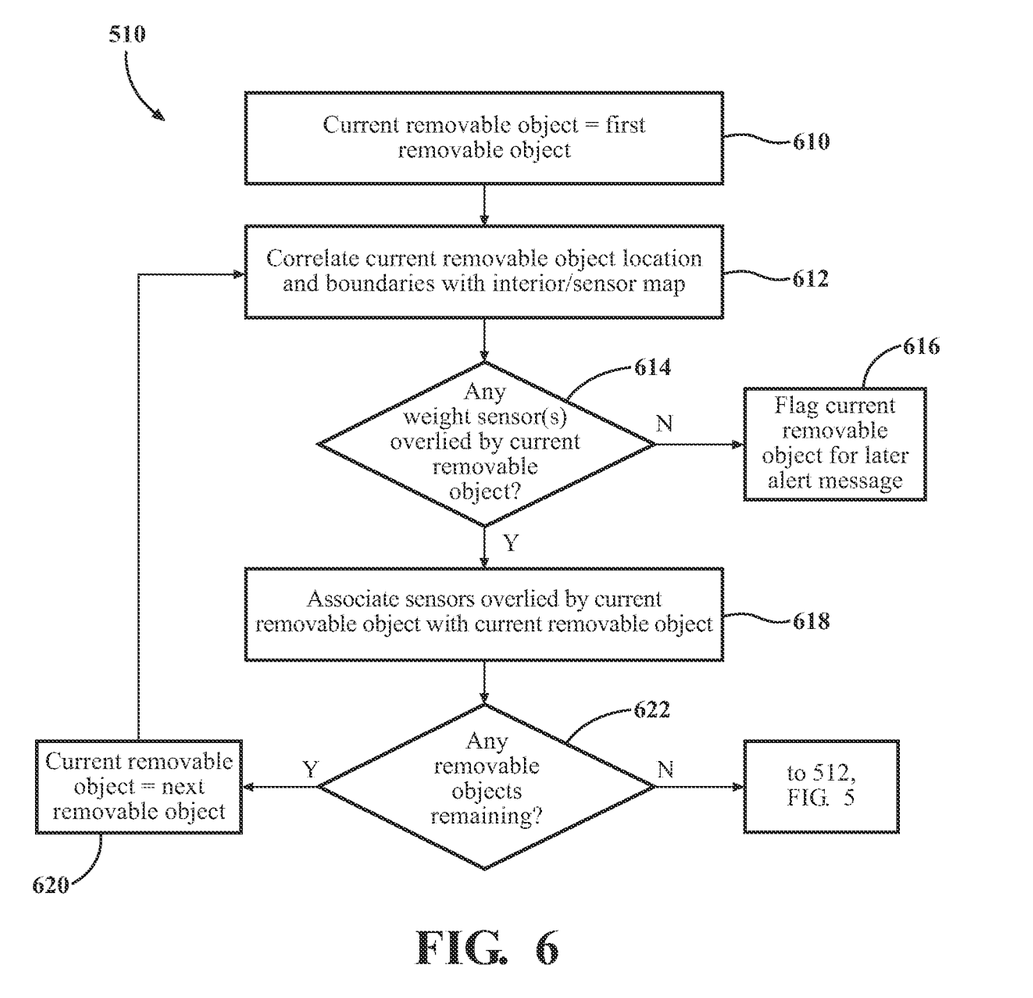
FIG. 6 is a block schematic flow diagram illustrating an example of a method of determining all weight sensors overlied by each a removable object positioned in the vehicle interior.

FIG. 6 is a block schematic flow diagram illustrating an example of a method of determining all weight sensors overlied by each a removable object positioned in the vehicle interior, per block 510 of FIG. 5. In block 610, the vision/image recognition system 188 may set a first removable object detected by the vision/image recognition system to be a current removable object. In one or more arrangements, any removable object detected by the system 188 may be selected as the first removable object. In block 612, the vision/image recognition system 188 may correlate a location of the current removable object and the edges/boundaries of the current removable object with a digital map of the vehicle interior as previously described, to determine positions of the object and its features on the digital map. In block 614, the vision/image recognition system 188 may compare the locations of features of the current removable object with locations of weight sensors as indicated on a sensor map of the interior (such as shown in FIG. 2) to determine what (if any) weight sensors are overlied by the current removable object. If no weight sensors are overlied by the current removable object, this fact may be flagged in (in block 616) and stored in a removable object data file of the object. In such a case, an alert message may be generated directed to indicating to a user that the object is determined to be removable but that its weight cannot be determined (for example, because the object does not appear to overlie any of weight sensors 185). If, however, the current object does overlie one or more of weight sensors 185, the system 188 may (in block 618) compile a list of the weight sensors overlied by the current removable object and associate the sensors with the current removable object. In block 622, the vision/image recognition system 188 may determine if there are any additional removable objects to evaluate for overlied sensors. If there are additional removable objects to evaluate for overlied sensors, the vision/image recognition system 188 may (in block 620) designate a next or other removable object as the current removable object for evaluation. The previously-described blocks 612-622 may then be repeated for the new removable object. This process may continue until all detected removable objects have been evaluated to determine if they overlie any weight sensors. If, however, all removable objects have been evaluated to determine if they overlie any weight sensors, control may pass to block 512 of FIG. 5.

Figure 7:
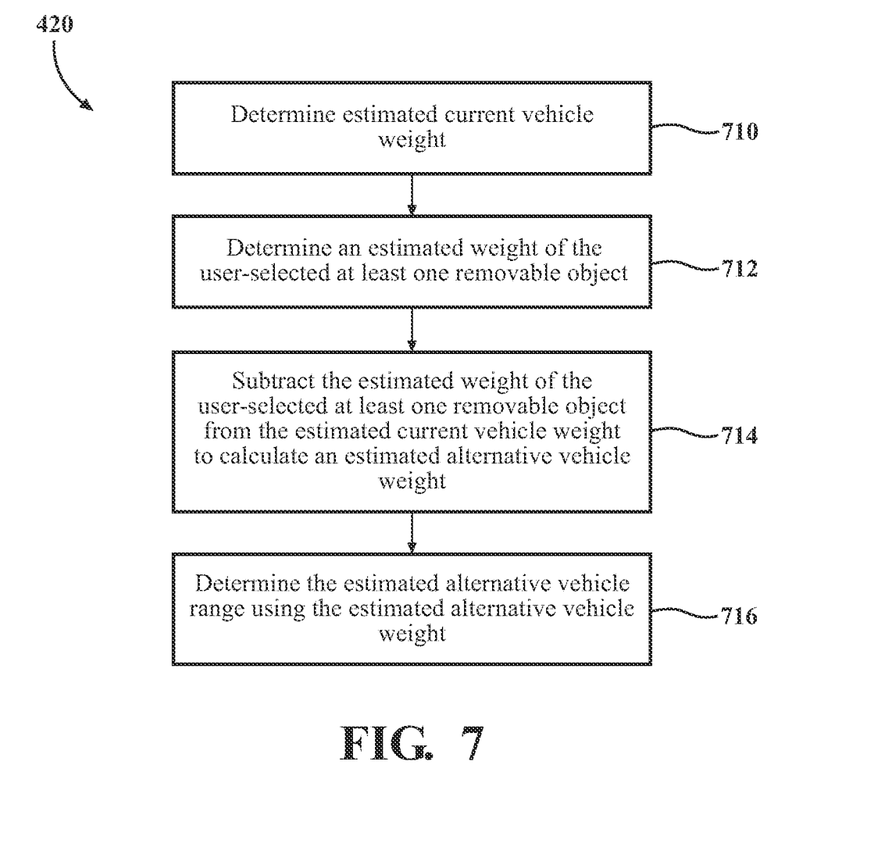
FIG. 7 is a block schematic flow diagram illustrating an example of a method of acquiring an estimated alternative vehicle range determined using estimated weight(s) of one or more user-selected removable objects positioned in the vehicle interior.

FIG. 7 is a block schematic flow diagram illustrating an example of a method of acquiring an estimated alternative vehicle range which has been determined using an estimated weight of at least one removable object selected by a user for possible removal from the vehicle, per block 420 of FIG. 4. Referring to FIG. 7, in block 710, an estimated current vehicle weight may be determined. In one or more arrangements, the estimated current vehicle weight may be determined by the VRES 186 using sensor data and/or other information. In block 712, an estimated weight of at least one user-selected removable object may be determined by a method and system previously described. In block 714, the estimated weight of the user-selected removable object(s) may be subtracted from the estimated current vehicle weight to calculate an estimated alternative vehicle weight. In block 716, an estimated alternative vehicle range may be determined using the estimated alternative vehicle weight. After the estimated alternative vehicle range has been determined, control may pass back to block to block 422 of FIG. 4.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the operator's computer, partly on the operator's computer, as a stand-alone software package, partly on the operator's computer and partly on a remote computer, or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An alternative range estimating system for a vehicle comprising:
   one or more processors; and
   a memory communicably coupled to the one or more processors and storing a removable object selection module including computer-readable instructions that when executed by the one or more processors cause the one or more processors to control operation of a vehicle input/output system to:
      display at least one selectable representation of an associated at least one removable object carried by the vehicle;
      acquire a user selection of at least one removable object from the at least one representation of the associated at least one removable object;
      acquire an estimated alternative vehicle range determined using an estimated weight of a user-selected at least one removable object; and
      display the estimated alternative vehicle range.

2. The alternative range estimating system of claim 1 wherein the at least one removable object includes a stowable object having a known weight and location.

3. The alternative range estimating system of claim 1 wherein the removable object selection module includes computer-readable instructions that when executed by the one or more processors cause the one or more processors to control operation of a vehicle input/output system to:
   acquire an estimated current vehicle range; and
   display both the estimated current vehicle range and the estimated alternative vehicle range simultaneously.

4. The alternative range estimating system of claim 3 further comprising a vehicle range estimating system including computer-readable instructions that when executed by the one or more processors cause the one or more processors to determine the estimated current vehicle range using an estimated current vehicle weight.

5. The alternative range estimating system of claim 4 wherein the vehicle range estimating system is configured to determine the estimated alternative vehicle range using an estimated alternative vehicle weight equal to an estimated current vehicle weight, less an estimated weight of the user-selected at least one removable object.

6. The alternative range estimating system of claim 4 wherein the removable object selection module further includes computer-readable instructions that when executed by the one or more processors cause the one or more processors to:
   acquire the estimated current vehicle weight;
   acquire an estimated weight of the user-selected at least one removable object;
   determine an estimated alternative vehicle weight by subtracting the estimated weight of the user-selected at least one removable object from the estimated current vehicle weight;
   communicate the estimated alternative vehicle weight to the vehicle range estimating system; and
   acquire, from the vehicle range estimating system, the estimated alternative vehicle range, wherein the estimated alternative vehicle range is determined using the estimated alternative vehicle weight.

7. The alternative range estimating system of claim 1, further comprising at least one weight sensor operably coupled to a surface of the vehicle, the at least one weight sensor being configured to detect a component of a weight of the user-selected at least one removable object when at least a portion of the user-selected at least one removable object contacts the surface of the vehicle.

8. The alternative range estimating system of claim 7 wherein the one or more processors and the memory are in communication with a vision/image recognition system including computer-readable instructions that when executed by the one or more processors cause the one or more processors to:
   determine values of parameters of each removable object of the user-selected at least one removable object, the parameters including boundary parameters and a location parameter for each removable object; and
   determine, using the values of the parameters of each removable object of the user-selected at least one removable object and a sensor map including locations of weight sensors positioned in the vehicle, all weight sensors which are overlied by each removable object of the user-selected at least one removable object.

9. The alternative range estimating system of claim 8 wherein the alternative range estimating system includes the vision/image recognition system.

10. The alternative range estimating system of claim 8 wherein the vision/image recognition system is configured to determine when a removable object of the associated at least one removable object has been present in the vehicle for more than one trip of the vehicle.

11. The alternative range estimating system of claim 10 wherein the removable object selection module includes computer-readable instructions that when executed by the one or more processors cause the one or more processors to control operation of a vehicle input/output system to, responsive to a determination that a removable object of the associated at least one removable object has been present in the vehicle for more than one trip of the vehicle, generate an alert message directed to identifying to a user the removable object of the associated at least one removable object that has been present in the vehicle for more than one trip of the vehicle.

12. The alternative range estimating system of claim 10 wherein the object selection module further includes computer-readable instructions that when executed by the one or more processors cause the one or more processors to control operation of a vehicle input/output system to:

highlight, on a display screen, a selectable representation of the removable object of the associated at least one removable object that has been in the vehicle for more than one trip of the vehicle; and display an estimated alternative vehicle range comprising an estimated vehicle range if the removable object of the associated at least one removable object that has been in the vehicle for more than one trip of the vehicle is removed.

13. The alternative range estimating system of claim 1 wherein the removable object selection module further includes computer-readable instructions that when executed by the one or more processors cause the one or more processors to acquire a list of weight sensors overlied by each removable object of the user-selected at least one removable object;

acquire weight sensor data from all weight sensors overlied by each removable object of the user-selected at least one removable object; and determine, using the weight sensor data and parameter values, an estimated weight of each removable object of the user-selected at least one removable object.

14. A method of controlling operation of a vehicle input/output system, comprising steps of:

controlling the system to display at least one selectable representation of an associated at least one removable object carried by a vehicle;

acquiring a user selection of at least one removable object from the at least one representation of the associated at least one removable object;

acquiring an estimated alternative vehicle range determined using an estimated weight of a user-selected at least one removable object; and controlling operation of the system to display the estimated alternative vehicle range.

15. The method of claim 14 wherein the step of acquiring an estimated alternative vehicle range determined using an estimated weight of the user-selected at least one removable object comprises steps of:

determining an estimated current vehicle weight;

determining an estimated weight of the user-selected at least one removable object;

subtracting the estimated weight of the user-selected at least one removable object from the estimated current vehicle weight to calculate an estimated alternative vehicle weight; and determining the estimated alternative vehicle range using the estimated alternative vehicle weight.

16. The method of claim 15 wherein the step of determining an estimated weight of the user-selected at least one removable object comprises steps of:

determining all weight sensors overlied by the user-selected at least one removable object;

acquiring data from the weight sensors overlied by the user-selected at least one removable object; and determining, using the data from the weight sensors overlied by the user-selected at least one removable object, the estimated weight of the user-selected at least one removable object.

17. The method of claim 16 wherein the step of determining all weight sensors overlied by the user-selected at least one removable object comprises steps of:

determining values of parameters of each removable object of the user-selected at least one removable object, the parameters including boundary parameters and a location parameter for each removable object; and determining, using the values of the parameters of each removable object of the user-selected at least one removable object and a sensor map including locations of weight sensors positioned in the vehicle, all weight sensors which are overlied by each removable object of the user-selected at least one removable object.

18. The method of claim 14 further comprising steps of:

determining when a removable object of the associated at least one removable object carried by the vehicle has been present in the vehicle for more than one trip of the vehicle; and generating, responsive to a determination that a removable object of the associated at least one removable object has been present in the vehicle for more than one trip of the vehicle, an alert message directed to identifying, to the user, the removable object of the associated at least one removable object that has been present in the vehicle for more than one trip of the vehicle.

* * * * *